US005792020A

United States Patent [19]
Kikuchi et al.

[11] Patent Number: 5,792,020
[45] Date of Patent: Aug. 11, 1998

[54] SUPPORTING STRUCTURE OF A RING GEAR SUPPORTING MEMBER IN PLANETARY GEAR DEVICE

[75] Inventors: Kimihiko Kikuchi; Takashi Hotta; Hisami Miyazaki, all of Saitama, Japan

[73] Assignee: Honda Giken Kogyo Kabushiki Kaisha, Tokyo, Japan

[21] Appl. No.: 805,998

[22] Filed: Feb. 24, 1997

Related U.S. Application Data

[63] Continuation of Ser. No. 395,612, Feb. 28, 1995.

[30] Foreign Application Priority Data

Mar. 1, 1994 [JP] Japan .................. 6-031594

[51] Int. Cl.$^6$ .................................. F16H 3/44
[52] U.S. Cl. .......................... 475/346; 475/331
[58] Field of Search ............... 475/331, 346–348

[56] References Cited

U.S. PATENT DOCUMENTS

| | | | |
|---|---|---|---|
| 4,270,412 | 6/1981 | Beijer et al. | 475/331 |
| 4,387,607 | 6/1983 | Sakakibara | 475/331 X |
| 4,656,890 | 4/1987 | Marquardt | 475/331 X |
| 4,730,517 | 3/1988 | Hamano et al. | 475/331 X |
| 4,914,978 | 4/1990 | Moroto et al. | 475/71 |
| 4,994,007 | 2/1991 | Miura et al. | 475/346 |
| 5,026,337 | 6/1991 | Miura et al. | 475/283 |
| 5,295,925 | 3/1994 | Hirabayashi | 475/331 |
| 5,480,361 | 1/1996 | Murakami et al. | 475/328 |
| 5,643,126 | 7/1997 | Hotta et al. | 475/348 X |

FOREIGN PATENT DOCUMENTS

| | | |
|---|---|---|
| 0 453 118A1 | 10/1991 | European Pat. Off. |
| 6487944 | 4/1989 | Japan |

OTHER PUBLICATIONS

Abstract of JP 1087944, published Apr. 1989 (English translation).

*Primary Examiner*—Khoi Q. Ta
*Assistant Examiner*—Peter T. Kwon
*Attorney, Agent, or Firm*—Lyon & Lyon LLP

[57] ABSTRACT

A planetary gear device P includes a planetary carrier 3 integrally provided with a shaft portion $3_1$, a ring gear supporting member 7 having a ring gear 6 fixedly mounted on the outer periphery thereof, and an output member 10 spline-connected to the outer periphery of the shaft portion $3_1$. The right side of the ring gear supporting member 7 is supported on the left side of the planetary carrier 3 through a first thrust bearing 13, and the left side of the ring gear supporting member 7 is supported through a second thrust bearing 16 on the right side of a washer 15 secured to the shaft portion $3_1$, of the planetary carrier 3 by means of a circlip 14. With this arrangement, it is possible to reduce vibrations transmitted from the ring gear supporting member 7 of the planetary gear device P to the output member 10, to improve the mounting property of the planetary gear device P and to facilitate the management of dimensions of parts.

12 Claims, 4 Drawing Sheets

SUPPORTING STRUCTURE OF A RING GEAR SUPPORTING MEMBER IN PLANETARY GEAR DEVICE

This application is a Continuation Application of application Ser. No. 08/395,612 filed on Feb. 28, 1995.

BACKGROUND OF THE INVENTION

1. Field of the Invention

The present invention relates to a supporting structure of a ring gear supporting member in a planetary gear device, including: a center shaft; a planetary carrier relatively rotatably fitted on an outer periphery of the center shaft through a shaft portion; an output member attached to the shaft portion; a ring gear supporting member having an inner periphery which is relatively rotatably fitted on said shaft portion and an outer periphery which supports a ring gear; and a first thrust bearing and a second thrust bearing for supporting opposite sides of the ring gear supporting member.

2. Description of the Prior Art

In a planetary gear device in which a ring gear is provided in an outer periphery of a disk-like ring gear supporting member, it is necessary that both axial sides of the ring gear supporting member be supported by thrust bearings in order to receive thrust forces generated in the meshing portions of the gears to axially locate the ring gear supporting member. Such a supporting structure of a ring gear supporting member for a planetary gear device of an automobile automatic transmission has been heretofore well known as disclosed in Japanese Patent Application Laid-Open No. 87944/89 Publication.

FIG. 4 shows the above-described conventional supporting structure. The planetary gear device provided in an automatic speed change transmission of an automobile is provided with a sleeve 02 relatively rotatably fitted on an outer periphery of a main shaft 01. A planetary carrier 03 is relatively rotatably supported on an outer periphery of the sleeve 02. A shaft portion $04_1$ of an output gear 04 for transmitting a driving force to a counter shaft (not shown) is fitted and spline-connected to an outer periphery of a shaft portion $03_1$ formed integrally with the planetary carrier 03. The output gear 04 is supported on a casing 05 of the transmission through a taper roller bearing 06. A disk-like ring gear supporting member 07 provided with a ring gear (not shown) in an outer periphery thereof has one side supported by a first thrust bearing 08 disposed between it and one side of the planetary carrier 03, and the other side supported by a second thrust bearing 09 disposed between it and an end $04_2$ of the shaft portion $04_1$ of the output gear 04. With this arrangement, the ring gear supporting member 07 is supported rotatably relative to the planetary carrier 03 and the output gear 04.

The above-described conventional supporting structure has a problem in that vibrations of the ring gear supporting member 07 are directly transmitted to the output gear 04 through the second thrust bearing 09, which vibrations lead to a source of noises. There is a further problem in that since the planetary carrier 03, the ring gear supporting member 07, the first thrust bearing 08 and the second thrust bearing 09 cannot be preassembled as a unit, the mounting of those elements in the planetary gear device is difficult. There is another problem in that since the locating precision of one side B of the planetary carrier 03 relative to a reference surface A of the casing 05 is determined by the accumulation of errors in dimension of many members (i.e., the taper roller bearing 06, the output gear 04, the second thrust bearing 09, the ring gear supporting member 07 and the first thrust bearing 08), the quality control of dimensions of the members is very severe.

SUMMARY OF THE INVENTION

The present invention has been made in view of the aforementioned circumstances. It is an object of the present invention to provide a supporting structure of a ring gear supporting member in planetary gear device which can overcome the aforementioned problems.

For achieving the aforementioned object, according to the present invention, there is provided a planetary gear device comprising a center shaft, a planetary carrier relatively rotatably fitted on an outer periphery of the center shaft through a shaft portion, an output member attached to the shaft portion, a ring gear supporting member having an inner periphery which is relatively rotatably fitted on said shaft portion and an outer periphery which supports a ring gear, and a first thrust bearing and a second thrust bearing for supporting opposite sides of the ring gear supporting member, wherein the first thrust bearing is interposed between one side of the ring gear supporting member and one side of the planetary carrier, and the second thrust bearing is interposed between the other side of the ring gear supporting member and the shaft portion.

According to the above-described construction, the first thrust bearing is disposed between one side of the ring gear supporting member and one side of the planetary carrier, and the second thrust bearing is disposed between the other side of the ring gear supporting member and the shaft portion, whereby vibrations of the ring gear supporting member are not directly transmitted to an output member through the second thrust bearing thereby overcoming the problems of generation and transmission of noises. Further, since the first thrust bearing, the ring gear supporting member and the second thrust bearing can be integrally mounted and assembled on the shaft portion of the planetary carrier, the mounting of these elements is improved. Furthermore, since the locating precision between the planetary carrier and the output member is not affected by the precision of the dimensions of the first thrust bearing, the ring gear supporting member and the second thrust bearing, the quality control of the dimensions of those members is facilitated.

Moreover, if an anti-swivel protrusion formed in an inner periphery of a washer of the second thrust bearing is fitted in a spline groove formed in an outer periphery of the shaft portion of the planetary carrier, the anti-swivel operation of the washer of the second thrust bearing can be accomplished easily.

The above and other objects, features and advantages of the present invention will become apparent from the following explanation of the preferred embodiments with reference to the accompanying drawings.

DESCRIPTION OF THE PREFERRED EMBODIMENTS

Figure 1:
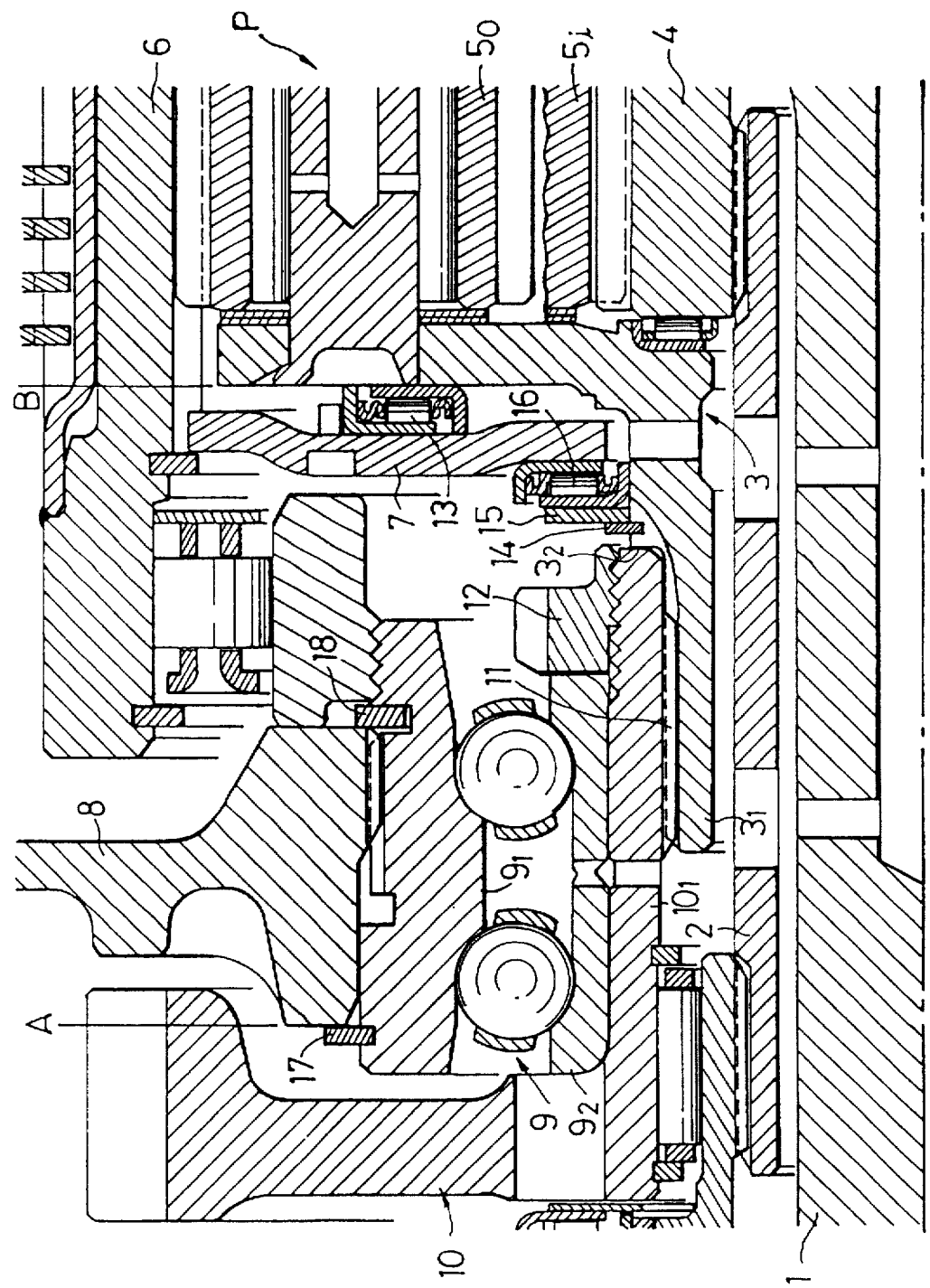
FIG. 1 is a longitudinal sectional view of a planetary gear device according to a first embodiment of the present invention.

In FIG. 1, a double-pinion type planetary gear device P provided in an automatic speed change transmission of an automobile is provided with a planetary carrier 3 supported on an outer periphery of a main shaft 1 with a sleeve 2 interposed therebetween. On the planetary carrier 3 are supported a plurality of inner planetary gears 5i meshed with a sun gear 4 spline-connected to the outer periphery of the sleeve 2 and a plurality of outer planetary gears 5o meshed with planetary gears 5i and a ring gear 6. An inner periphery of a disk-like ring gear supporting member 7 is relatively rotatably fitted on an outer periphery of a shaft portion 3, formed integrally with the planetary carrier 3, and the ring gear 6 is fixedly mounted on the outer periphery of the ring gear supporting member 7.

An output gear 10 as an output member supported on a casing 8 of the automatic speed change transmission through a ball bearing 9 is integrally provided with a shaft portion $10_1$ spline-connected at 11 to the outer periphery of the shaft portion $3_1$ of the planetary carrier 3. An outer race $9_1$ of the ball bearing 9 is secured to the casing 8 by means of a pair of circlips 17 and 18, and the output gear 10 is secured to an inner race $9_2$ of the ball bearing 9 by means of a nut 12 threaded into the outer periphery of the end of the shaft portion 101.

A first thrust bearing 13 is interposed between the right side of the ring gear supporting member 7 and the left side of the planetary carrier 3. A second thrust bearing 16 is interposed between a washer 15, secured by a circlip 14 to the shaft portion $3_1$ of the planetary carrier 3, and the left side of the ring gear supporting member 7. An end of the shaft portion $10_1$ of the output gear 10 is abutted against and positioned at a shoulder $3_2$ formed adjacent to but with a spacing from the left side of the circlip 14 on the outer periphery of the shaft portion $3_1$ of the planetary carrier 3.

The thrust force exerting on the output gear 10 during the operation of the planetary gear device P is received by the casing 8 through the ball bearing 9. The leftward thrust force exerted on the planetary carrier 3 and the leftward thrust force transmitted from the ring gear supporting member 7 to the planetary carrier 3 are received by the casing 8 through the output gear 10 and the ball bearing 9.

With this arrangement, the vibrations of the ring gear supporting member 7 are transmitted to the planetary carrier 3 through the first thrust bearing 13 and the second thrust bearing 16. However, since the second thrust bearing 16 is not directly supported on the output gear 10, which is different from the prior art shown in FIG. 4, the vibrations transmitted from the ring gear supporting member 7 to a counter shaft (not shown) through the output gear 10 are moderated to reduce noises.

When the planetary gear device P having the above-described construction is assembled, the first thrust bearing 13, the ring gear supporting member 7, the second thrust bearing 16, the washer 15 and the circlip 14 can be mounted in advance on the shaft portion $3_1$ of the planetary carrier 3 and assembled. Therefore, the mounting ability can be considerably improved as compared with the case where the planetary carrier 3, the first thrust bearing 13, the ring gear supporting member 7 and the second thrust bearing 16, etc. are separately mounted.

Figure 4:
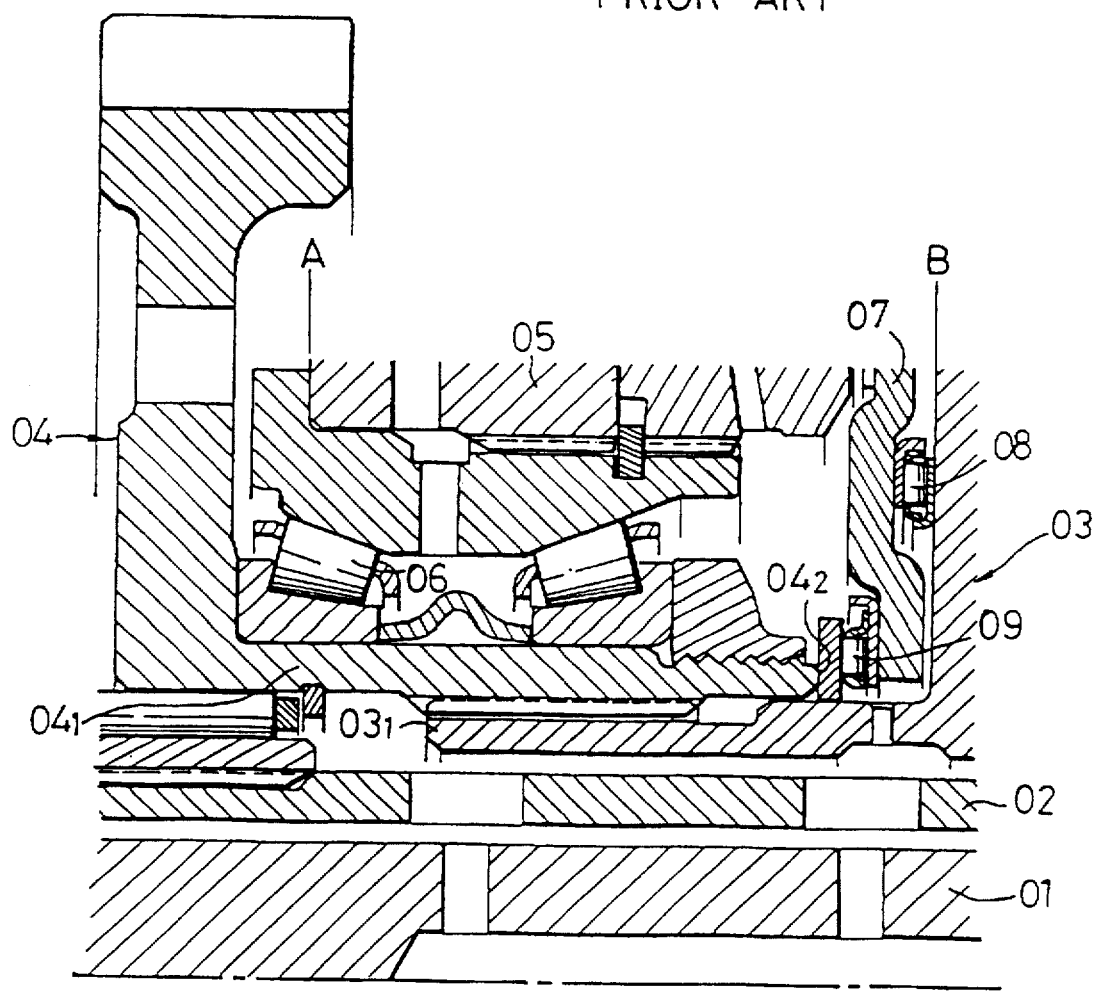
FIG. 4 is a longitudinal sectional view of a conventional planetary gear device.

The precision required in locating one side B of the planetary carrier 3 relative to a reference surface A of the casing 8 merely depends on the dimensional precision of the ball bearing 9, the output gear 10 and the planetary carrier 3 but does not depend on the dimensional precision of the first thrust bearing 13, the ring gear supporting member 7 and the second thrust bearing 16, as in the prior art construction shown in FIG. 4. Therefore, the quality control of dimensions is easy as compared with the prior art shown in FIG. 4. The positioning of the ring gear supporting member 7 supported on the planetary carrier 3 can be easily performed merely by adjusting the thickness of the washer 15.

Figure 2:
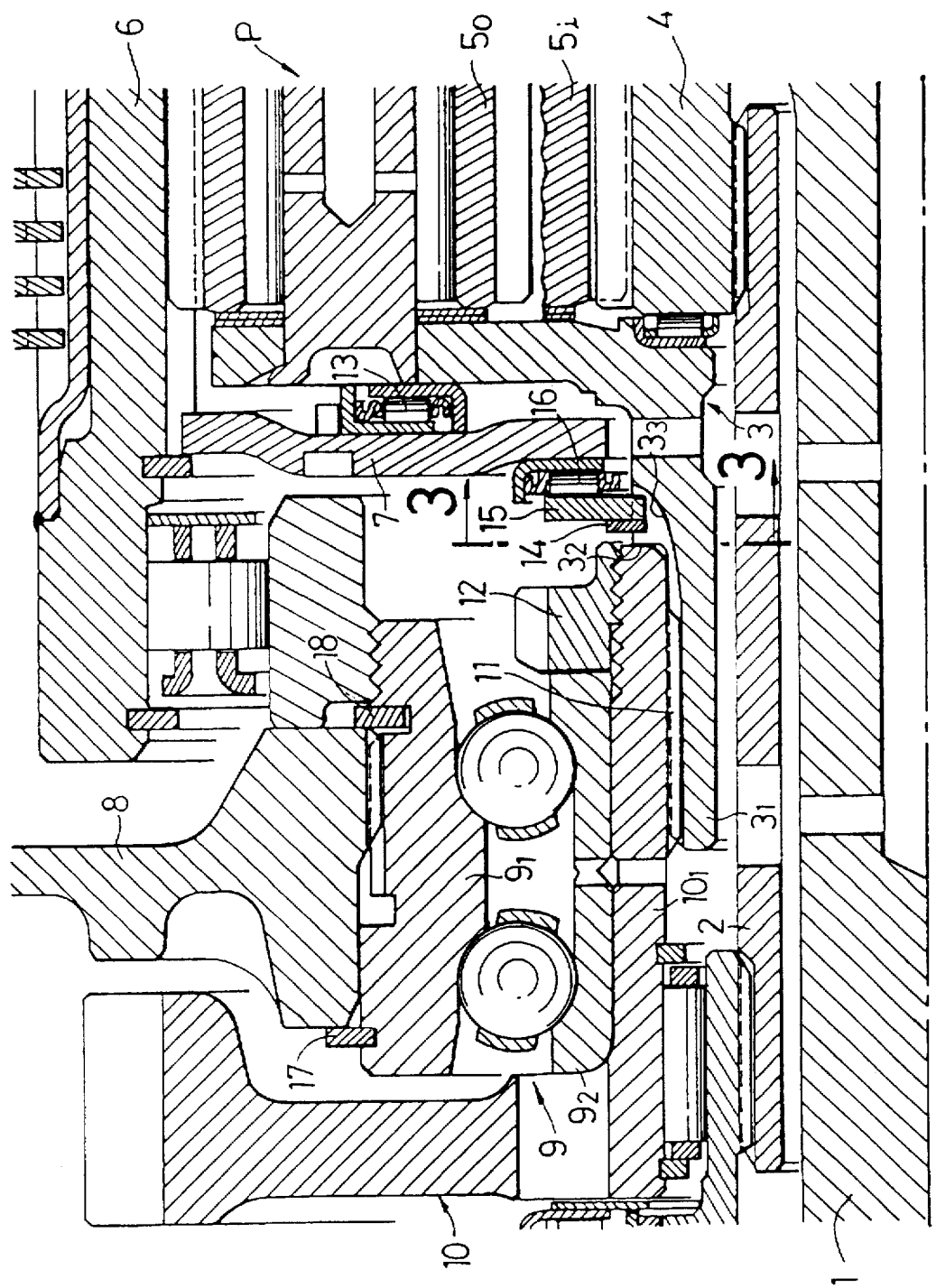
FIG. 2 is a view corresponding to FIG. 1 according to a second embodiment of the present invention.
Figure 3:
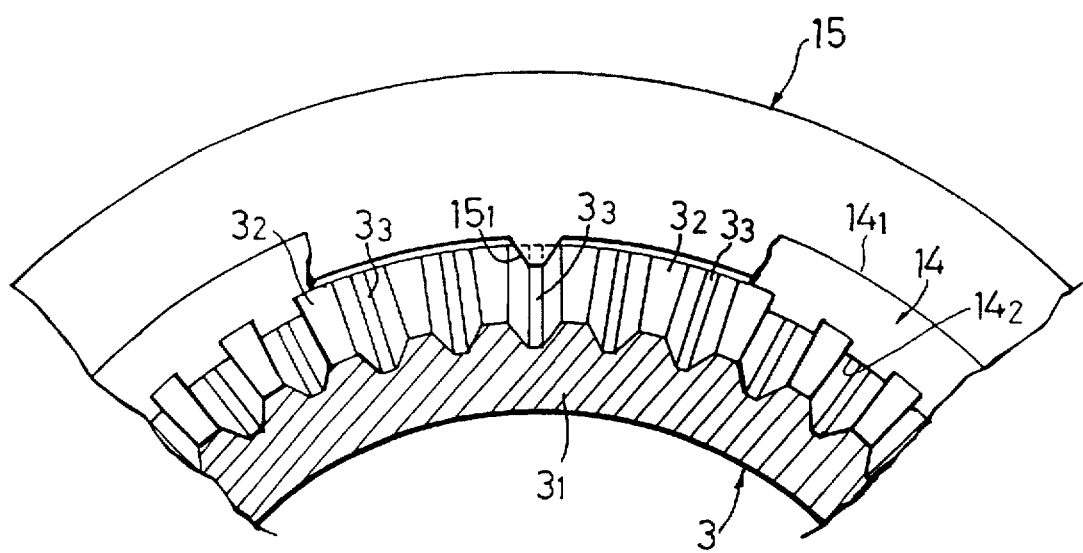
FIG. 3 is an enlarged sectional view taken on line 3—3 of FIG. 2.

Next, a second embodiment of the present invention will be described with reference to FIGS. 2 and 3.

The second thrust bearing 16 in the second embodiment is not provided with a bearing race on the left side (on the circlip 14 side), but rather the washer 15 functions as the bearing race. Spline grooves $3_3$ formed in the outer periphery of the shaft portion $3_1$ of the planetary carrier 3 to fix the shaft portion $10_1$ of the output gear 10 slope radially outwardly on the right end side (on the second thrust bearing 16 side). Four anti-swivel protrusions $15_1$ extend inwardly at intervals of 90° from the inner periphery of the washer 15. The anti-swivel protrusions $15_1$ are fitted in the spline grooves $3_3$ which slope radially outwardly whereby the anti-swivel function can be applied to the washer 15 without using a separate member. In FIG. 3, the reference character $14_1$ designates an outer peripheral edge of the circlip 14, and the reference character $14_2$ designates an inner peripheral edge of the circlip 14, which is broken-away in the drawing to illustrate the protrusion $15_1$. Other components and constructions of the second embodiment are the same as those of the afore-described first embodiment, whereby their description will not be repeated here, but the second embodiment can achieve the same operations and effects as those of the first embodiment.

While the embodiments of the present invention have been described in detail, it is to be noted that the present invention is not limited to the above-described embodiments but various changes in design can be made. For example, while in the above embodiments, the circlip 14 was used as means for securing the second thrust bearing 16 to the shaft portion $3_1$ of the planetary carrier 3, it is to be noted that other securing means can be used in place of the circlip 14. Further, while in the above embodiments, the double-pinion type planetary gear device P having the inner planetary gears 5i meshed with the sun gear 4 and the outer planetary gears 5o meshed with the ring gear 6 has been illustrated, it is to be noted that the present invention also can be applied to a single pinion type planetary gear device P having planetary gears which are simultaneously meshed with the sun gear 4 and the ring gear 6. Furthermore, in the second embodiment for example, the number of the anti-swivel protrusions $15_1$ formed on the washer 25 is not limited to four but can be suitably changed.

What is claimed is:

1. A supporting structure of a ring gear supporting member in a planetary gear device, comprising:

a center shaft;

a planetary carrier relatively rotatably fitted on an outer periphery of the center shaft through a shaft portion;

an outer shaft member attached to said shaft portion;

a ring gear supporting member having an inner periphery relatively rotatably fitted on said shaft portion and an outer periphery supporting a ring gear;

a first thrust bearing and a second thrust bearing for supporting opposite sides of said ring gear supporting member, wherein said first thrust bearing is interposed between one side of said ring gear supporting member and one side of said planetary carrier, and said second thrust bearing is interposed between another side of said ring gear supporting member and said shaft portion; and stopper means for holding said second thrust bearing in place on said shaft portion, said stopper means being spaced from an end of said output shaft member for providing a spacing between said second thrust bearing and said end of said output shaft member for minimizing the transmission of vibrations from said ring gear supporting member through said second thrust bearing to said output shaft member.

2. The supporting structure of a ring gear supporting member in a planetary gear device according to claim 1, wherein an anti-swivel protrusion is formed on an inner periphery of a washer of said second thrust bearing and is fitted in a spline groove formed in an outer periphery of said shaft portion of said planetary carrier.

3. The supporting structure of claim 2, wherein a plurality of spline grooves are formed in said shaft portion, and said washer is provided with a plurality of circumferentially spaced anti-swivel protrusions fitted in said spline grooves.

4. In a supporting structure of a ring gear supporting member in a planetary gear device having a planetary carrier with a shaft portion attached to a power transmitting member, the ring gear supporting member being rotatably positioned on the shaft portion and supporting a ring gear, and first and second thrust bearings supporting opposite sides of the ring gear supporting member, an improvement comprising:

said first thrust bearing being interposed between one side of the ring gear supporting member and the planetary carrier, and said second thrust bearing being interposed between another side of the ring gear supporting member and the shaft portion; and stopper means for holding said second thrust bearing in place on said shaft portion, said stopper means being spaced from an end of said power transmitting member for providing a spacing between said second thrust bearing and said end of said power transmitting member for minimizing the transmission of vibrations from said ring gear supporting member through said second thrust bearing to said power transmitting member.

5. The supporting structure of claim 4, wherein an anti-swivel protrusion is formed on an inner periphery of a washer of said second thrust bearing and is fitted in a spline groove formed in an outer periphery of the shaft portion of the planetary carrier.

6. The supporting structure of claim 5, wherein a plurality of spline grooves are formed in said shaft portion, and said washer is provided with a plurality of circumferentially spaced anti-swivel protrusions fitted in said spline grooves.

7. A supporting structure of a ring gear supporting member in a planetary gear device, comprising:

a center shaft;

a planetary carrier relatively rotatably fitted on an outer periphery of the center shaft through a shaft portion;

an output shaft member attached to said shaft portion;

a ring gear supporting member having an inner periphery relatively rotatably fitted on said shaft portion and an outer periphery supporting a ring gear;

a first thrust bearing and a second thrust bearing for supporting opposite sides of said ring gear supporting member;

an anti-swivel protrusion on an inner periphery of a washer of said second thrust bearing, said anti-swivel protrusion fitted in a spline groove in an outer periphery of said shaft portion of said planetary carrier;

wherein said first thrust bearing is interposed between one side of said ring gear supporting member and one side of said planetary carrier, and said second thrust bearing is interposed between another side of said ring gear supporting member and said shaft portion.

8. The supporting structure of claim 7 wherein a plurality of spline grooves are formed in said shaft portion, and said washer is provided with a plurality of circumferentially spaced anti-swivel protrusions fitted in said spline grooves.

9. The supporting structure of claim 7 wherein said output shaft member is spaced apart from said second thrust bearing.

10. In a supporting structure of a ring gear supporting member in a planetary gear device having a planetary carrier with a shaft portion, the ring gear supporting member being rotatably positioned on the shaft portion and supporting a ring gear, and first and second thrust bearings supporting opposite sides of the ring gear supporting member, an improvement comprising:

an anti-swivel protrusion formed on an inner periphery of a washer of said second thrust bearing and fitted in a spline groove in an outer periphery of the shaft portion of the planetary carrier;

said first thrust bearing interposed between one side of the ring gear supporting member interposed between one side of the ring gear supporting member and the planetary carrier, and said second thrust bearing interposed between another side of the ring gear supporting member and the shaft portion.

11. The supporting structure of claim 10 wherein a plurality of spline grooves are formed in said shaft portion, and said washer is provided with a plurality of circumferentially spaced anti-swivel protrusions fitted in said spline grooves.

12. The supporting structure of claim 10 wherein said output shaft member is spaced apart from said second thrust bearing.

* * * * *

UNITED STATES PATENT AND TRADEMARK OFFICE
CERTIFICATE OF CORRECTION

PATENT NO. : 5,792,020

DATED : August 11, 1998

INVENTOR(S) : Kikuchi, et al.

It is certified that error appears in the above-identified patent and that said Letters Patent is hereby corrected as shown below:

Column 4, line 59, change "outer" to --output--.

Signed and Sealed this

Second Day of March, 1999

Attest:

Q. TODD DICKINSON

*Attesting Officer*  *Acting Commissioner of Patents and Trademarks*